March 2, 1937.  O. H. SCHADE  2,072,278
VOLTAGE MULTIPLIER CIRCUIT
Filed May 9, 1935  2 Sheets-Sheet 1
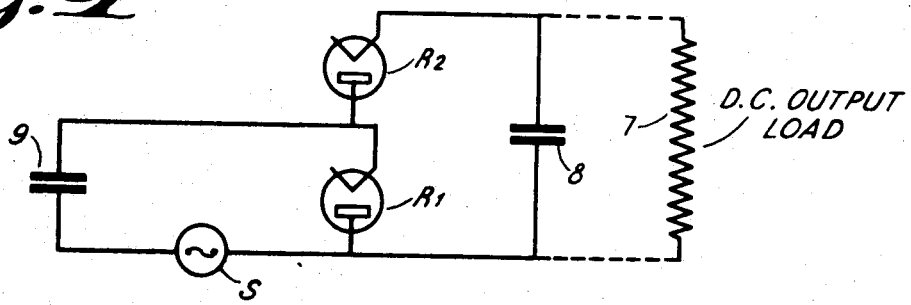
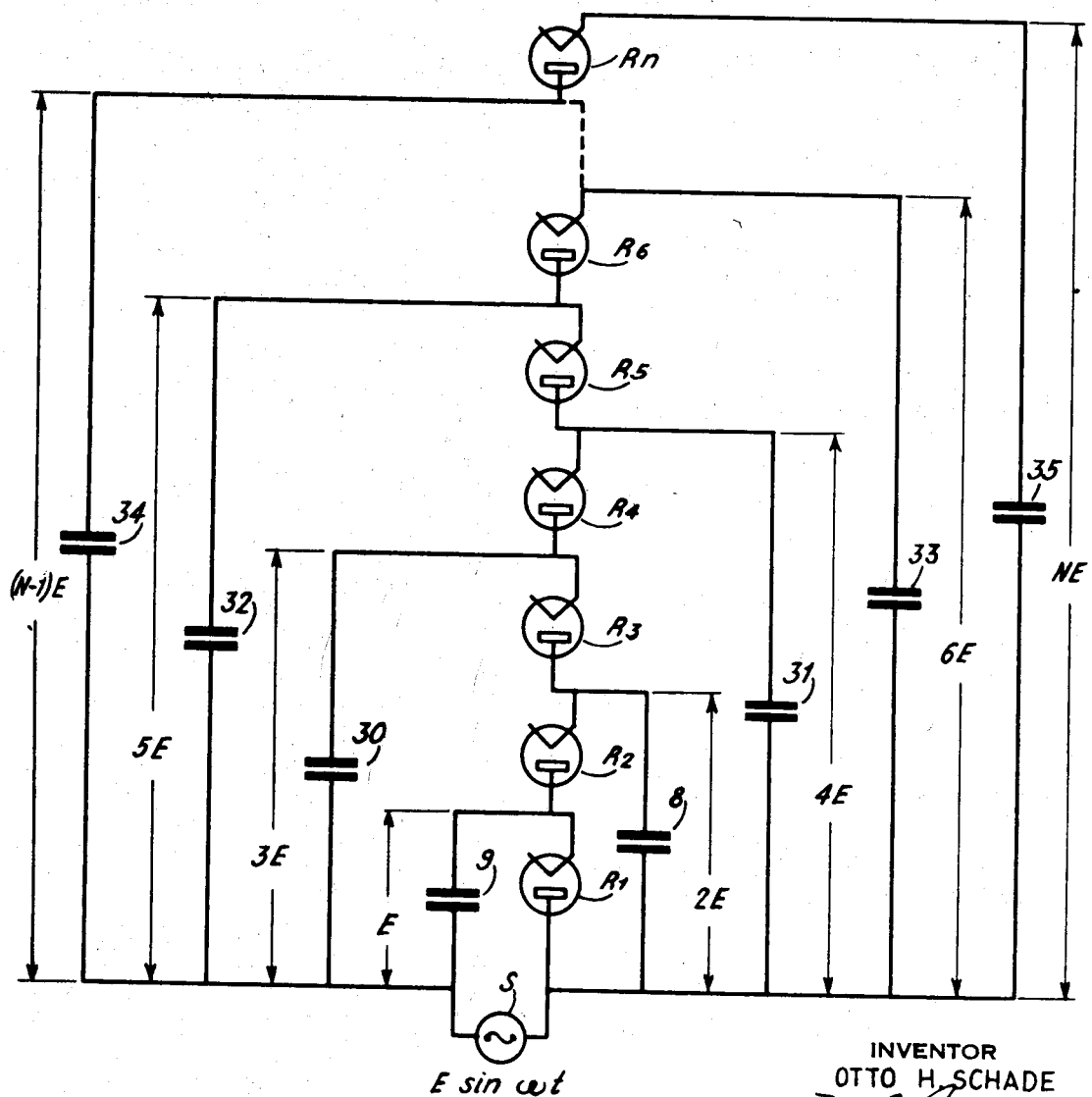
INVENTOR
OTTO H. SCHADE
BY
ATTORNEY March 2, 1937.    O. H. SCHADE    2,072,278
VOLTAGE MULTIPLIER CIRCUIT
Filed May 9, 1933    2 Sheets-Sheet 2

INVENTOR
OTTO H. SCHADE
BY
ATTORNEY

Patented Mar. 2, 1937

2,072,278

UNITED STATES PATENT OFFICE 2,072,278

VOLTAGE MULTIPLIER CIRCUIT

Otto H. Schade, West Orange, N. J., assignor to Radio Corporation of America, a corporation of Delaware Application May 9, 1933, Serial No. 670,069

8 Claims. (Cl. 250—27)

The present invention relates to voltage multipliers and more particularly to voltage multipliers adapted to be used in conjunction with radio receivers and the like.

It is an object of the present invention to disclose a broad method of setting upon a novel type of voltage multiplier possessing certain desirable characteristics.

It is another object of the present invention to devise a circuit arrangement for producing unidirectional current from alternating current of greater voltage than the voltage of the alternating current without the use of transformers.

Another object of the invention is to provide a novel method of connecting a load to a voltage multiplier arrangement.

Specific objects of the present invention will unfold themselves in the following detailed specification when read in conjunction with the accompanying drawings.

It is well known in the art that any number of diodes may be connected in series with a load and separately excited with alternating current. The resulting direct current load voltage will be the sum of the individual voltages generated by the several rectifiers and the same direct current will flow through all the rectifiers. For systems such as are now known reference is made to the publication "Electronics" of February 1932, pages 50 and 51. In particular, attention is directed to Fig. 2, page 50 of said publication. If a voltage doubler such as shown therein is used to supply the energizing potentials for a radio receiver provided with indirectly heated cathode tubes, whereon all the heaters are connected in series with the proper series resistance across the same A. C. line as supplies the voltage for the doubler circuit, there may be developed a high A. C. potential difference between the heater and the cathode of any tube of the receiver circuit. This potential difference is due to the fact that the D. C. voltage developed across the load in the voltage doubler circuit is floating with respect to the A. C. power supply line or ground.

In other words, the relatively high potential applied between the heaters and the cathodes may cause leakage currents of sufficient magnitude to cause disturbances in the circuits.

Because of the above mentioned potential difference between heater and cathode a low frequency disturbance current is set up in the tubes of the receiver circuit, causing undesirable hum effects in the signal reproducer.

It is an object of the present invention to reduce to a considerable degree the above mentioned undesirable hum effects by eliminating the A. C. potential developed between the heater and cathode inherent in the system noted above, by providing a circuit arrangement such that one side of the A. C. power line and the negative side of the D. C. load are common.

In the drawings,

Figure 1 is a diagrammatic showing of a circuit which incorporates in simplified form the basic circuit arrangement utilized for accomplishing the purpose of the invention;

Figure 2:
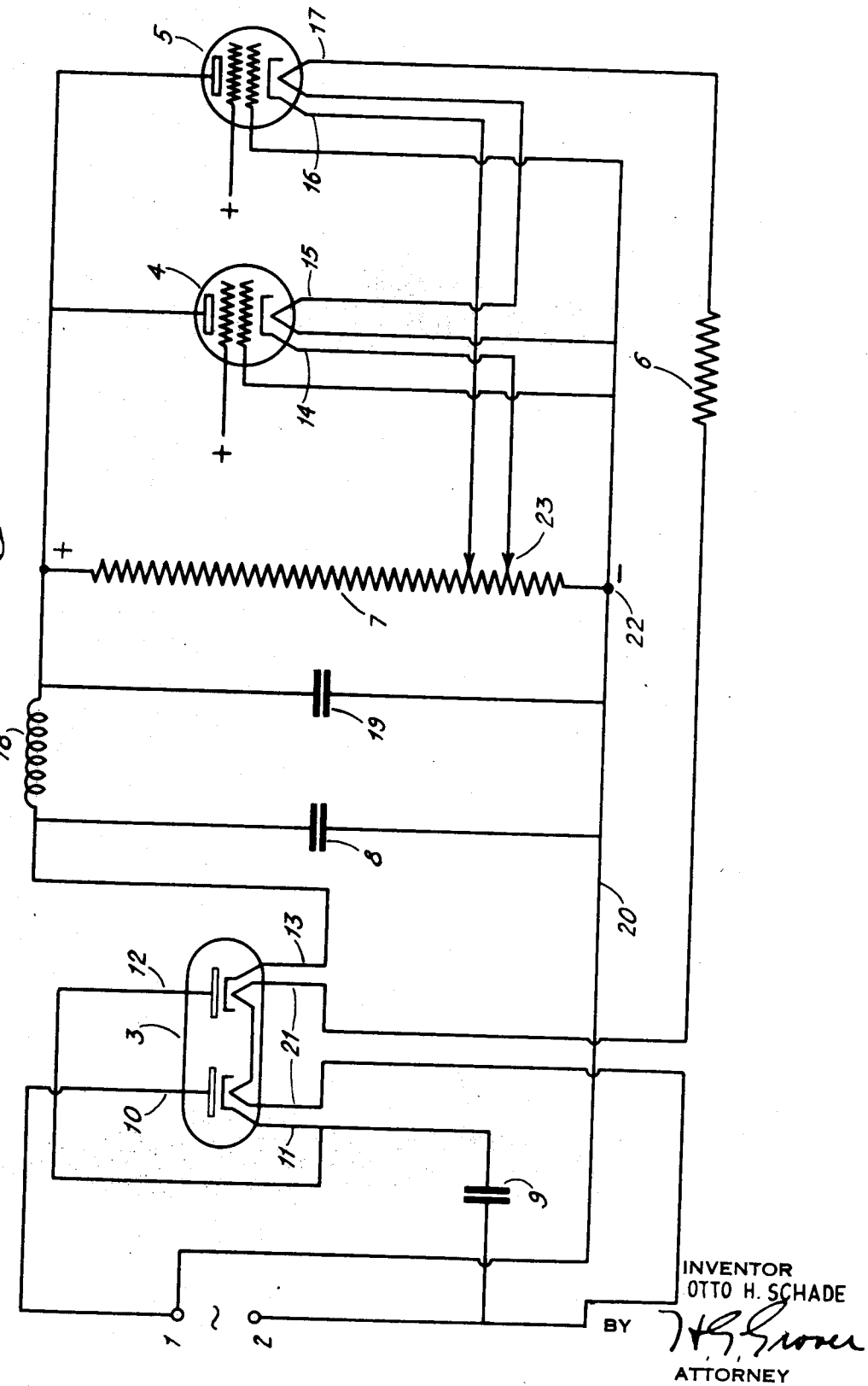
Figure 2 illustrates a preferred embodiment of the invention wherein a voltage doubler arrangement is shown energizing several tubes of a radio receiver; and, Figure 3 illustrates a circuit arrangement wherein the features of the present invention are incorporated in a voltage multiplier for producing any desired multiple of the source voltage.

In Figure 1 which shows a voltage doubler arrangement, two diodes $R_1$ and $R_2$ are connected in series with a load represented generally as a resistance 7. The two diodes and the load 7 form a uni-directional direct current path. The alternating current source S is connected across diode $R_1$ in series with a condenser 9 thus forming a condenser charging circuit including the source S, condenser 9 and diode or rectifier $R_1$ all in series. A second condenser 8 is shunted across both rectifiers $R_1$ and $R_2$ as shown and acts to form a charging circuit including source S, condenser 9, diode $R_2$ and condenser 8 all in series. With the arrangement shown, during one half cycle of the current from source S the condenser 9 is charged to substantially the peak voltage of the source S through rectifier $R_1$ whereas during the other half cycle the condenser 8 is charged to approximately twice the peak voltage of the source due to the fact that the potential across condenser 9 and the potential of the source S act in series through rectifier $R_2$. Accordingly, the available voltage across the condenser 8 is substantially twice the voltage of the source S.

The application of the system involved to a voltage multiplier of N number of sections is shown in Figure 3. In this figure diodes $R_1$, $R_2$ ... $R_n$ are connected in a chain so that any desired number thereof may be connected in series with a load. It is obvious that diodes $R_1$ and $R_2$ together with condensers 8 and 9 and source S form the voltage doubler circuit shown in Fig. 1. Hence, there is available across condenser 8 a direct current voltage approximately twice the A. C. voltage of source S. Adding a third rectifier R₃ and the condenser feed circuit including condenser 30 provides a circuit for obtaining a direct current potential which is substantially three times the A. C. voltage of the source S. In this case the tripled voltage is available across condenser 30. Adding still another diode link R₄ and condenser feed 31 a voltage substantially four times the A. C. line voltage is available across condenser 31. Thus, the voltage obtainable may be increased as desired by the addition of a suitable number of links.

It is apparent at once that a great advantage resulting from the system of voltage multiplication shown is that one side of the A. C. network and one side of the D. C. network are common.

This is of particular advantage in cases where the voltage multiplier is used to energize a plurality of electronic tubes provided with indirectly heated cathodes, the heaters of which are arranged in series and connected to the same source of A. C. as is the voltage multiplier. In such cases the cathodes are connected to the negative side of the D. C. line through a bias resistance. Since the negative side of the line may be one side of the A. C. network as described above, the heater circuit and the cathode will be maintained at substantially the same A. C. potential. This feature of the present invention will be more clearly set out in connection with the description of the system shown in Fig. 2.

In Figure 2, terminals 1 and 2 represent the two sides of the usual power supply system furnishing alternating current. Tube 3 comprises a rectifier tube of the type having two anodes 10 and 12 and two separate indirectly heated cathodes 11 and 13. This type of tube is equivalent to two single rectifiers, that is to say, plate 10 and cathode 11 cooperate to form one rectifier while plate 12 and cathode 13 cooperate to form a second rectifier.

The rectifier portion including plate 10 and cathode 11 is connected across terminals 1 and 2 through a condenser 9, while the rectifier comprising plate 12 and cathode 13 is connected to the terminals 1 and 2 through condensers 8 and 9 in series as shown. The output of the voltage multiplier circuit is impressed across a voltage divider resistance 7 through a usual filter circuit arrangement comprising a choke coil 18 and a filter condenser 19. The voltage divider resistance is utilized in customary manner to derive the desired potentials for the tubes of a receiver.

For purposes of illustration two so-called screen grid tubes, namely, 4 and 5, have been shown although any other type tube or tubes may equally well be energized by the system shown.

The heater current for the tubes 3, 4 and 5 is obtained from the terminals 1 and 2 through a series resistance 6 of the proper value. The heaters of all the tubes are connected in series with the source and the resistance 6. The heater circuit may be traced from terminal 1 through conductor 20, heater 15, heater 17, resistor 6, heater 21 of tube 3, back to terminal 2. It is at once apparent from the above that one side of the heater string is connected to the negative side of the D. C. load as at point 22. Thus, the A. C. potential difference between the heater and cathode is reduced to a minimum since, taking tube 4 as an example, the cathode 14 is connected to point 22 through the portion 22, 23 of the voltage divider resistance 7 with the result that the cathode 14 and heater 15 are at practically the same A. C. potential.

The operation of the system shown in Fig. 2 is as follows:—

Assuming terminal 1 positive, plate 10 becomes positive with respect to cathode 11 thereby allowing current to pass through the space path between anode 10 and cathode 11, thereby charging condenser 9 to the peak A. C. input voltage. In the next half cycle when terminal 1 becomes negative and terminal 2 becomes positive, plate 12 becomes positive with respect to cathode 13, thus allowing current to flow through the space path between anode 12 and cathode 13, thus charging condenser 8. Since the charge across condenser 9 aids the A. C. potential of the source 1 and 2 the voltage across condenser 8 will be approximately the sum of the source peak voltage and the charge across condenser 9, thereby giving a D. C. output voltage of approximately twice the A. C. input voltage.

To those skilled in the art many variations of the details of the system and apparatus described will at once be obvious and the fact that specific arrangements have been illustrated is not to be taken as indicating any intention of limiting the invention.

I claim:

1. In combination, a voltage multiplier circuit comprising, a direct current closed path including a plurality of rectifiers and a load circuit in series, a source of alternating current, a circuit including one of said rectifiers and a condenser in series across said source, means for alternately energizing said circuit for causing a current to flow through said rectifier thereby producing a potential difference across said condenser which is approximately equal to the potential of said source, a second condenser connected across said load, a series circuit comprising said two condensers and the other of said rectifiers connected across said source and means for periodically impressing said source potential and the potential difference across the first named condenser in aiding phase across the second named condenser whereby the potential difference developed across the second named condenser is approximately equal to twice the source potential, said load including at least one space discharge device provided with an indirectly heated cathode, a heater circuit for said cathode connected to said source and means for maintaining the cathode of said space discharge device at substantially the same alternating current potential as the heater circuit thereof.

2. In a voltage multiplier circuit, a rectifier chain comprising a plurality of rectifiers in series, a source of alternating current, means for connecting one side of the first of said rectifiers to one side of the source, means including a condenser for connecting the other side of said first rectifier to the other side of said source, connections between one set of alternate junctions between the other of said rectifiers and one terminal of said source, each of said connections including a condenser and connections between the other set of alternate junctions between said other rectifiers and the other terminal of said source each of said last-named connections including a condenser.

3. In combination, a voltage multiplier circuit comprising, a direct current closed path including a plurality of rectifiers and a load circuit all in series, a source of alternating current including two terminals, means for separately exciting each of said rectifiers comprising a plurality of circuits each thereof including at least one capacitive element for connecting each of the rectifiers across the source, said capacitive elements being arranged in two sets, the elements of each set being in multiple with respect to each other, one of said sets being connected to one of said terminals and the other set being connected to the other of said terminals, said load circuit comprising at least one electronic tube having an anode, an indirectly heated cathode and at least one grid electrode, all of said tube elements being arranged with respect to each other in said first-named circuit so that they are maintained at respectively the proper operating potentials, means including at least a portion of said direct current circuit for connecting the heater circuit across the alternating current source, and means including said portion of the direct current circuit for connecting the cathode of the tube to a terminal of the alternating current source whereby the cathode and heater circuit are maintained substantially at the same alternating current potential to thereby prevent the transference of hum frequencies from the heater circuit to the cathode.

4. In an electrical network, a voltage multiplier circuit comprising a direct current closed path including a plurality of rectifiers and a load circuit in series, a source of alternating current, means including a condenser for connecting said source across one of said rectifiers, a second condenser connected across the load circuit, said load circuit comprising at least one electronic tube having an indirectly heated cathode and an anode, said cathode and anode being connected to the first-named circuit so that the anode is maintained at a positive potential with respect to the cathode, a heater circuit for the cathode and means including at least a portion of the circuit which connects the cathode of the tube to the voltage multiplier circuit for connecting the heater circuit across the alternating current source whereby said heater circuit and said cathode are maintained at substantially the same alternating current potential to thereby preclude the transference of hum frequencies from the heater circuit to the cathode.

5. A system as disclosed in claim 8 wherein the load circuit comprises two electronic tubes each thereof being provided with at least an anode and an indirectly heated cathode, a voltage divider resistance connected across the voltage multiplier output and means for connecting the cathodes of the tubes to different points of the voltage divider resistor.

6. In an electrical network, a pair of terminals adapted to be connected to a source of power supply, an electronic tube provided with two anodes and two indirectly heated cathodes, a heater circuit for said cathodes, an electronic tube provided with an anode, a grid electrode and an indirectly heated cathode, a heater circuit for said last-named cathode, an energizing circuit for said heaters comprising a connection from one of said terminals to the other thereof including said heater circuits in series, a connection from one of said terminals to one of the anodes of said first-named tube and a connection including a condenser from the second terminal to the cathode cooperating with the last-named anode, a connection from the last-named cathode to the other anode of the first-named tube and a connection including a choke coil from the cathode cooperating with the last-named anode to the anode of the electronic tube, a condenser connected between the last-named cathode and the first terminal, a resistor element connected from the anode of said electronic tube to said first-named terminal and a connection from the cathode of the electronic tube to a point of said resistor.

7. In a power supply system adapted to be connected between a source of alternating current and a load, said system being provided with a pair of input terminals for connection to the source of alternating current, said load comprising an electronic tube provided with an anode, an indirectly heated cathode and at least one grid electrode, a line conductor for connecting the first of said pair of terminals to the cathode, a heater for the cathode, an energizing circuit for said heater comprising a connection from said first terminal to the second of said pair of terminals, said connection including at least a portion of said line conductor, a first rectifier element including an anode and a cathode, a connection including a condenser between the second of said pair of terminals and the anode of the rectifier element, a connection between the cathode of the rectifier element and the anode of the electronic tube, a circuit including a condenser for connecting the cathode of said electronic tube to the anode thereof, a second rectifier element including an anode and a cathode, means for connecting said last-named cathode to a point of the circuit connecting the second terminal and the anode of the first-rectifier element intermediate the first-named condenser and the anode of the first named rectifier element and a connection from said first terminal to the anode of the second rectifier element.

8. A system as described in the next preceding claim characterized by that the cathodes of the two rectifier elements are provided with heaters for indirect heating thereof and by that the heaters are included in series in the circuit utilized for energizing the heater of the electronic tube.

OTTO H. SCHADE.